United States Patent

[11] 3,537,384

| [72] | Inventor | Siegfried Stauber |
| | | Zurich, Switzerland |
| [21] | Appl. No. | 730,098 |
| [22] | Filed | May 17, 1968 |
| [45] | Patented | Nov. 3, 1970 |
| [73] | Assignee | Eveco Trust Reg. |
| | | Mauren, Liechtenstein |
| | | a corporation of Liechtenstein |
| [32] | Priority | May 22, 1967 |
| [33] | | Switzerland |
| [31] | | 7,144 |

[54] STEAM AND WATER PREPARING MACHINE, ESPECIALLY FOR PREPARING COFFEE AND TEA BEVERAGES
6 Claims, 3 Drawing Figs.

[52] U.S. Cl. ............................................. 99/302
[51] Int. Cl. ............................................. A47j 31/24
[50] Field of Search ................................... 99/302, 300, 301, 293, 294, 295, 307, 309, 310

[56] References Cited
UNITED STATES PATENTS

| 1,631,753 | 6/1927 | Midulla | 99/302 |
| 2,688,911 | 9/1954 | Hochmayr | 99/302 |
| 3,278,087 | 10/1966 | Stasse | 99/302 |

Primary Examiner—Robert W. Jenkins
Attorney—Werner W. Kleeman

ABSTRACT: A steam and water preparation machine, especially useful for making coffee and tea beverages, which is of the type comprising a pump unit for delivering a practically constant feed volume per revolution. A pouring head is provided for discharging the delivered feed volume, and an electrically heated pipelike throughflow heater means is operably coupled with the pump unit. Electrical heating means serves to heat the pipelike heater means. The invention further contemplates the provision of means for varying the pump delivery or the heating power of the pipelike throughflow heater means.

# 3,537,384

STEAM AND WATER PREPARING MACHINE, ESPECIALLY FOR PREPARING COFFEE AND TEA BEVERAGES

BACKGROUND OF THE INVENTION

The present invention relates to an improved electrically heated steam and water preparing machine, especially for making coffee and tea beverages, and which is of the type incorporating a throughflow heater and a pouring head.

The previously known conventional coffee machines operate relatively slowly since, generally, a larger quantity of water must be heated, whereafter such is then first passed through the coffee powder or granules. A further drawback of existing coffee machines resides in the fact that because of a too intensified and long heating of the water lime or calcareous deposits result, whereby the taste of the coffee beverage is changed. Furthermore, if there is too long a contact time between the water and the coffee powder the possibility exists that the tannin and bitter materials will be dissolved out.

SUMMARY OF THE INVENTION

Accordingly, it is a primary object of the present invention to provide an improved machine of the aforementioned type which effectively overcomes the drawbacks of the prior art structures.

Still, a further significant and more specific object of the present invention relates to the provision of an improved steam and water preparing machine, especially for making coffee and tea beverages, which is relatively simple in construction, economical to manufacture, quite easy to use, and capable of producing such beverages so that they retain a pleasing and good taste.

Now, in order to implement these and still further objects of the invention, which will become more readily apparent as the description proceeds, the inventive machine is generally manifested by the features that the electrically heated throughflow heater is preferably constructed in the form of a riser or uptake pipe which is disposed between the pouring head and liquid feed pump. This motor-driven feed pump is capable of delivering a practically constant feed volume independent of fluctuations in the suction pressure and delivery pressure for each revolution thereof, and such pump can be driven with at least two rotational speeds or the heating of the throughflow heater has at least two heating stages.

The inventive machine thus renders possible the preparation of an exactly controlled supply of hot water, whereby the throughflow velocity through the filter head is practically not dependent upon most fluctuating resistances which appear in such. Additionally, with a machine of the type proposed by the invention it is selectively possible to make normal coffee or so-called espresso, since the pump delivery or the heating power is variable.

BRIEF DESCRIPTION OF THE DRAWINGS

The invention will be better understood, and objects other than those set forth above, will become apparent when consideration is given to the following detailed description thereof. Such description makes reference to the annexed drawings wherein.

DESCRIPTION OF THE PREFERRED EMBODIMENTS

Figure 1:
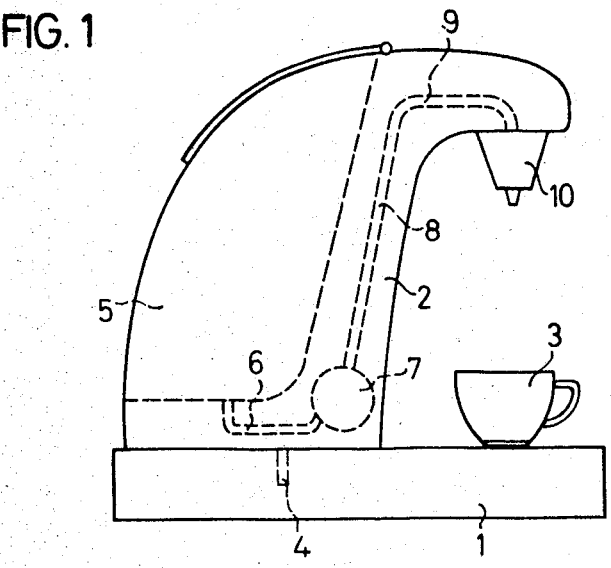
FIG. 1 is a schematic front view of the inventive machine.

Describing now the drawings, the machine depicted by way of example in FIG. 1 can be used both for the production of coffee and tea beverages as well as also only for the production of hot water or steam. It will be seen that the machine incorporates a substantially plate-shaped support or base 1 which serves as a stand upon which there can be deposited suitable receptacles or cups 3 for the beverage. The plate-shaped support 1 also serves to carry or receive a pivotal upper portion 2 equipped with a filter or pouring head 10. This upper portion 2 is preferably rotatively mounted for movement about a bolt member 4. Furthermore, all of the components required for the preparation of the water or steam are accommodated in the upper portion 2. The support or lower base portion 1 is constructed in such a fashion that there can also be installed therein a heating plate for preheating and maintaining heated the cups, receptacles or the like.

A suitable water reservoir 5 is located at the upper portion 2. From the lower region of the water reservoir 5 there extends a pipe or conduit 6 which leads to a pump unit 7. This pump unit 7, with a predetermined or given rotational speed, operates at an essentially constant delivery volume and serves to pump the water into a substantially pipe-shaped standing throughflow heater means 8. The water is delivered from this throughflow heater means 8 via a pipe bend 9 into the filter head 10. This filter head 10 can be detached in the event that it is only desired to prepare hot water or steam. The pump unit 7 is driven by a suitable drive motor 12 (FIG. 3) and cooperates with a speed reduction drive 11 which brings about the required large speed-reduced rotational movement for a preselector device 30.

In order for the pump unit 7 to be able to convey an exactly predetermined quantity of water at a predetermined temperature through the powder or the like located in the filter head 10, it is necessary for the pump unit to carry out its delivery operation essentially independent of the suction pressure and the counterpressure at the pressure side, since the delivered quantity again is determinative for the water temperature leaving the throughflow heater 8.

Figure 2:
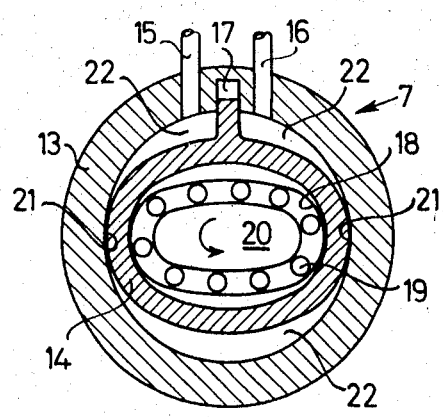
FIG. 2 is a sectional view through the pump unit used in the the machine of FIG. 1.

A particularly advantageous construction of pump unit 7 suitable for the purposes of the present invention has been shown in greater detail in FIG. 2 and is constructed as a so-called "piston pump". This pump unit 7 is externally provided with a stator ring 13 having a bore, as shown, in which there is arranged a rubber sleeve or collar member 14. This rubber collar 14 is inserted at one location so as to be stationary in a groove 17 between the infeed pipe 15 and the delivery pipe 16. A slightly deformable thin-walled ring member 18 is located internally of this rubber collar 14 and at the inside of which spheres or balls 19 roll when the centrally arranged elliptical rotor 20 rotates. Owing to the substantially elliptical shape of the rotor 20 there is formed two diametrically opposed sealing locations 21 at which the sleeve or collar member 14 bears in sealing fashion against the ball of the stator ring 13. Compartments or chambers 22 are formed at both sides of the sealing locations 21. These compartments 22 wander or travel during the rotation of the rotor 20 in the direction of rotation, and thus, serve to pump the water delivered via the infeed pipe or conduit 15 into the delivery or discharge pipe 16.

This delivery pipe 16 is arranged in throughflow communication with the pipe structure of the pipelike throughflow heater means 8. Since there is not only one, but rather two spacedly arranged sealing locations 21, the delivered quantity is essentially not dependent upon whether the infeed pipe 15 is pressureless or whether the delivered liquid is under pressure, so that instead of connecting the pump unit 7 to the pressureless water reservoir 5 it can also be directly connected to the water supply network which is under pressure. The delivered quantity is also essentially independent of the counterpressure prevailing in the conduit 16 and therefore, in the filter head 10, so that also the delivered quantity is practically only dependent upon the rotational speed of the rotor 20. In this manner the throughflow heater means 8 can be adjusted quite accurately with respect to the thermal or heating power delivered to the water and accommodated to the quantity delivered by the pump unit 7. However, it would also be possible to allow the rotor 20 to slide in ellipticlike or polygonal fashion directly at the collar member 14 provided that a suitable selection of material is undertaken.

Figure 3:
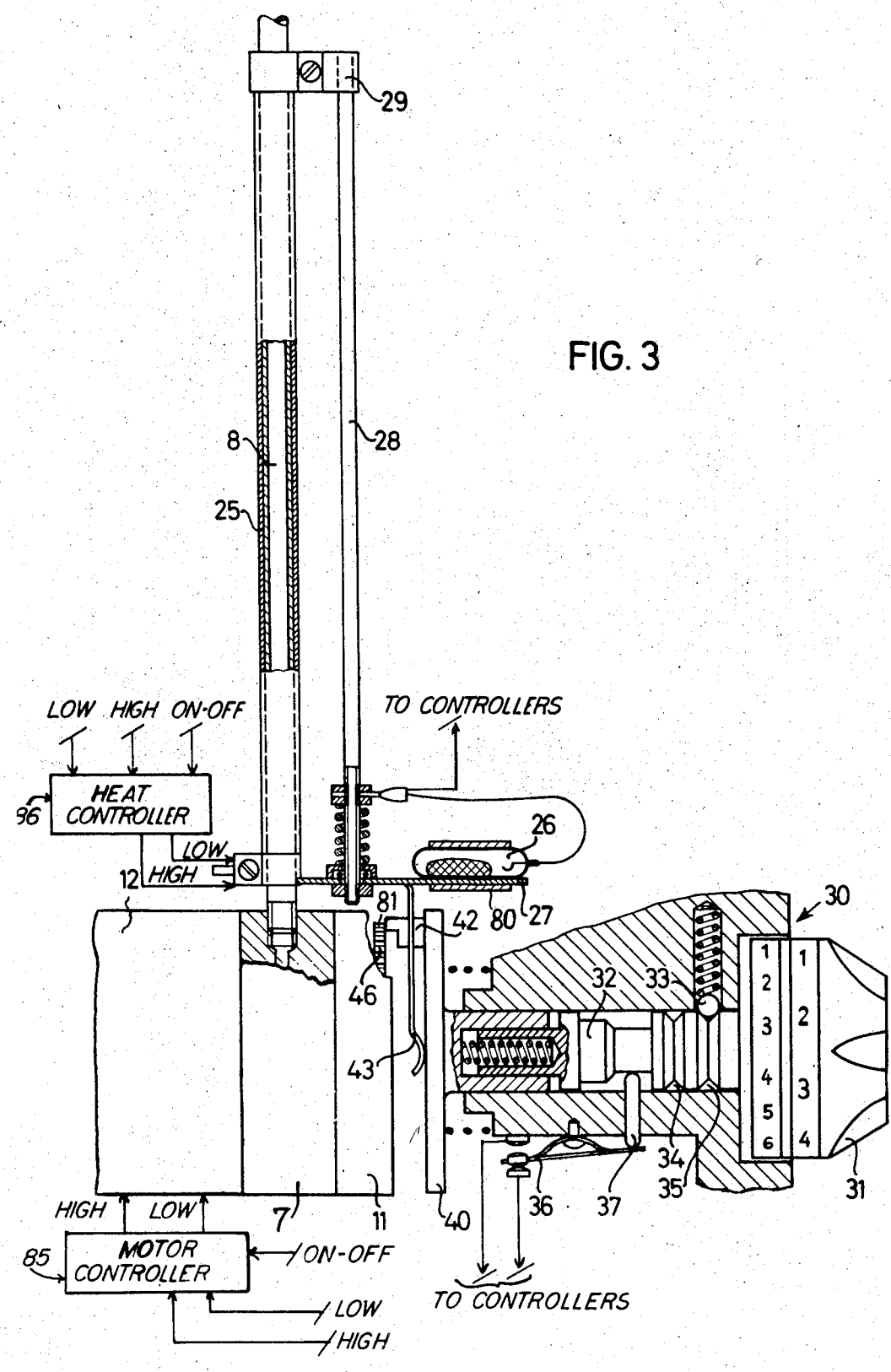
FIG. 3 is a sectional view through the preselector device and the throughflow heater of the machine of FIG. 1.

FIG. 3 depicts in a somewhat simplified manner the components which are located internally of the upper portion 2 of the machine under consideration. Thus, it will be recognized for the purpose of predetermining the quantity of water which is to be heated there is provided a preselector device 30. Furthermore, a resistance heating unit 25 is arranged about the pipe-shaped throughflow heater means 8 and which can be operably coupled at a switch with the electrical supply network. In the current circuit of this resistance heating member 25 and/or in the current circuit of the pump 7 as will be described below, there is arranged a mercury switch member 26 which is seated upon a beam or balance 80. More precisely, it will be recognized that this mercury switch 26 is secured to a horizontal arm member 27 which is adjusted in such a way that in the cold condition of the through flow heater pipe 8 the drop of mercury closes this switch 26. In order to prevent any overheating of the throughflow heater 8 a rod member 28 cooperates with the moveably mounted resilient arm member 27. This rod member 28 is fixedly secured to a clamp member 29 located at the upper end of the heater pipe 8. The thermal expansion resulting from the heating of this heater pipe 8 brings about a change in length of the pipe which, in turn, is transmitted to the arm member 27, whereby the switch 26 is switched out as soon as there occurs a predetermined or permissible heating operation.

In order to be able to predetermine or regulate the quantity of fluid which moves through the throughflow heater means 8, there is provided the previously mentioned preselector device 30. The latter incorporates a rotary knob 31 which cooperates with a shaft member 32. This shaft member 32, together with the rotary knob 31 is axially as well as rotationally displaceable. In the illustrated shaft position, a ball member 33 is selectively resiliently engaged with a retaining rear groove member 35. When shaft 32 and knob 31 are axially displaced toward the right in the drawing, ball member 33 resiliently engages with a forward groove member 34. Both of these positions of the shaft, forward or rear, determine the contact position of an electric switch 36 through the agency of a switching pin member 37 or the like, which rides upon either the enlarged or reduced diameter portions of the shaft in accordance with the shaft position. Switch 36 can either alter the rotational speed of the drive motor in known manner and therefore, the delivery capacity of the pump unit 7 of the heating power of the throughflow heater means 8, for instance for making either regular coffee or espresso coffee, by means of any suitable electrical connection to the various contacts of switch 36 via conventional motor heat control apparatus 85 and 86, respectively.

By means of the rotary knob 31 it is possible to carry out a predetermined rotation which is transmitted via rotation of shaft 22 to a disc member 40. An entrainment member 42 provided for this disc member 40 and secured thereto engages in a tooth 46 of a gear 81 of the speed reduction transmission or drive 11 at a circumferential location determined by the amount of rotation of knob 31. A tongue member 43 extends from the balance arm 27 and bears against the front face of this disc member 40. When the pump unit 7 rotates, the disc member 40 is entrained and rotated in the opposite direction to the previous adjustment of the rotary knob 31 by virtue of the action of gear 81 of the transmission 11 whose rotational speed has been considerably stepped down from the pump speed, and this disc member 40 is rotated in the aforedescribed manner to such an extent until the entrainment member 42 thereof, which is provided with an inclined surface contacts and rocks the tongue member 43. When this happens the balance mercury switch 26 switches out the drive motor and/or the heating unit through suitable electrical connections to the conventional component controllers 85 and 86. Depending upon the angle of rotation which is manually carried out at the rotary knob 31, a predetermined number of pump revolutions is selected and there arrives, for example, a quantity of water through the throughflow heater means 8 which exactly corresponds to the desired number of cups. As a result, there can be achieved a preselection of the quantity of fluid or liquid which is to be heated.

It should be apparent from the foregoing detailed description that the objects set forth at the outset to the specification have been successfully achieved.

I claim:

1. A steam and water preparation machine, especially for making coffee and tea beverages, comprising a pump unit for delivering a practically constant feed volume per revolution, a pouring head for discharge of the delivered feed volume, an electrically heated pipelike throughflow heater means operably coupled with said pump unit, electrical heating means for heating said pipelike throughflow heater means, and means for varying the rotational speed of said pump unit and thus the pump delivery rate or the heating power of said pipelike throughflow heater means.

2. A steam and water preparation machine as defined in claim 1, further including a water reservoir, said pump unit being selectively connectable with said water reservoir or directly with a water supply network.

3. A steam and water preparation machine as defined in claim 1, further including means for fixedly securing one end of said pipelike throughflow heater means, an electric switch means for said electrical heating means cooperating with the other end of said pipelike throughflow heater means, said electric switch means being responsive to the thermal expansion of said pipelike throughflow heater means.

4. A steam and water preparation machine as defined in claim 3, said securing means being a clamp member which is rigidly attached to the upper end of said pipelike throughflow heater means, an intermediate member for operably connecting said clamp means with said electric switch means, said clamp means responding to changes in length of said pipelike heater means due to heating thereof.

5. A steam and water preparation machine as defined in claim 1, wherein said varying means further incorporates a preselector means which cooperates with said pump unit and which is dependent upon the number of revolutions thereof to selectively and automatically disconnect said pump or said heater means after a predetermined number of pump revolutions.

6. A steam and water preparation machine as defined in claim 1, wherein said pump unit incorporates a stator and a noncircular rotor, a substantially ring-shaped collar disposed between said stator and said rotor, said collar being formed of elastic material, said noncircular rotor deforming said elastic collar at least at two diametrically opposed locations in such a manner that between said elastic collar and said rotor there are formed at least two travelling sealing locations.